F. M. BURNHAM & C. A. MYERS.
VENTILATED PRODUCE CRATE.
APPLICATION FILED APR. 18, 1914.

1,142,300.

Patented June 8, 1915.

WITNESSES:
Albert R Bronner
S. Constine.

INVENTORS.
Francis Mortimer Burnham
Charles Albert Myers
BY
Wm F Booth
ATTORNEY

UNITED STATES PATENT OFFICE.

FRANCIS MORTIMER BURNHAM, OF KENTFIELD, AND CHARLES ALBERT MYERS, OF BERKELEY, CALIFORNIA.

VENTILATED PRODUCE-CRATE.

1,142,300. Specification of Letters Patent. Patented June 8, 1915.

Application filed April 18, 1914. Serial No. 832,760.

*To all whom it may concern:*

Be it known that we, FRANCIS MORTIMER BURNHAM and CHARLES ALBERT MYERS, citizens of the United States, residing, the said BURNHAM at Kentfield, in the county of Marin and State of California, and the said MYERS at Berkeley, county of Alameda, State of California, have invented certain new and useful Improvements in Ventilated Produce-Crates, of which the following is a specification.

Our invention relates to crates for containing and shipping produce, and especially to that type of these crates in which the outer or peripheral wall is composed of spaced slats, the intervals between the slots serving for ventilation, and the cross-sectional contour of said wall having beveled corners in order to avoid such close contact of one crate with another when piled or packed together, as to interfere with such ventilation. Crates of this type are quite commonly used for containing produce, such, for example, as potatoes, onions, garlic, etc., and are shipped long distances so that the produce is confined in them for a long time. The scheme for ventilation based on the spaced peripheral slats is effective as far as it goes, but it only affects the outside of the crate contents. It, therefore, happens that the interior of the produce-mass is not ventilated and by reason of this the middle of the crate contents suffers marked deterioration and injury.

It is the object of our invention to provide for a more thorough and complete ventilation, reaching not merely the outside of the crate contents, but its interior as well, so that the whole mass is well ventilated, and to this end our invention consists in the novel crate which we shall now fully describe by reference to the accompanying drawings, in which—

Figure 1:
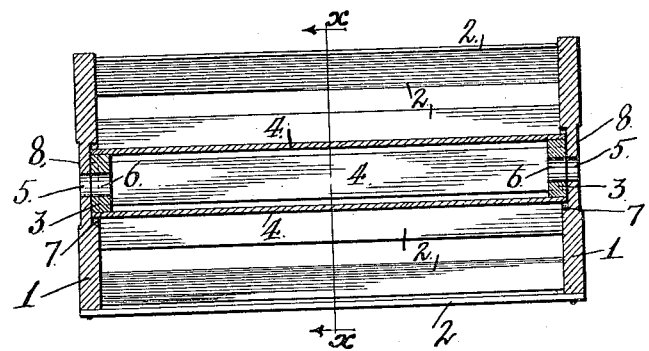
Figure 2:
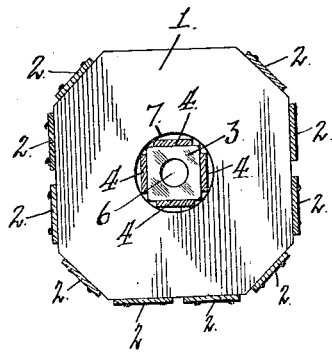
Figure 3:
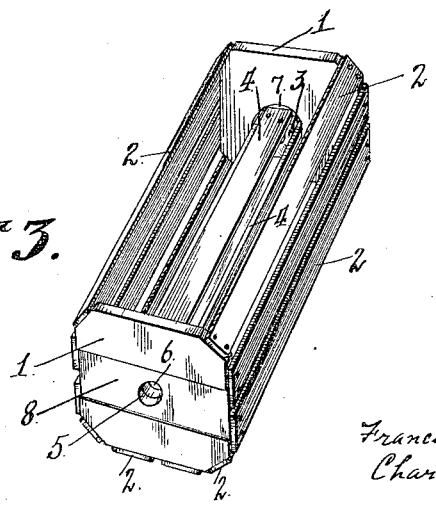

Figure 1 is a longitudinal vertical section of our crate. Fig. 2 is a cross section on the line *x—x* of Fig. 1. Fig. 3 is a perspective view of our crate.

1 are the ends of the crate, and 2 are the slats which form the outer or peripheral wall. In the figures here shown, the slats on top are omitted, thus showing the crate open, either ready to be filled or to have its contents removed, though it is to be understood that when filled and ready for shipment, the crate will have top slats also. The slats 2 are nailed to the ends 1 and said slats are spaced apart to leave intervening openings for free ventilation. In order to provide against a too close contact of the crates when stowed or piled together, which would have a tendency to close up too many of the ventilating spaces, the ends 1 are beveled at the corners, so that the crates will not lie too closely upon one another.

In order to provide ventilation for the interior of the mass of produce contained in the crate, we insert in its axis a pipe or passage which is open both to the interior of the crate and to the exterior through each end thereof. This pipe or passage may be of any suitable character. In practice, for economical and constructive reasons, we make it as here shown.

On the inner face of each end 1, in the middle thereof, is placed an end block 3, and to these blocks are nailed the slats 4. These slats are spaced apart, as shown, to leave ventilating openings. Through the ends 1 of the crate are made holes 5, and through the blocks 3 are made holes 6 which register with the holes 5. The central ventilating passage thus formed is held between the ends 1 of the crate, and in order to insure its position, it is best to let the blocks 3 into the ends in shallow sockets 7 therein. Thus the middle of the produce mass is ventilated as well as the outside, so the whole contents of the crate has free and sufficient ventilation.

In order to insure the middle ventilating passage being kept open, even when one crate lies or is piled upon the end of another, we cut out the ends 1 of the crate to make the shallow grooves 8 from the holes 5 outwardly to the edges of the ends. The sockets 7 are sufficiently larger than the blocks 3 to give the latter a little play, so that the interior ventilating pipe will bodily yield slightly under the shifting weight of the contents in handling the crate, thereby tending to relieve some strain.

We claim:—

1. A ventilated produce-crate comprising ends, and spaced slats connecting said ends to form the outer wall; blocks seated and movable in sockets on the inner faces of the ends, said ends and blocks having registering holes made through them; and spaced slats connecting said blocks.

2. A ventilated produce-crate comprising ends, and spaced slats connecting said ends to form the outer wall; blocks seated and movable in sockets on the inner faces of the ends, said ends and blocks having registering holes made through them and the outer faces of the ends being grooved from the holes to their edges; and spaced slats connecting said blocks.

In testimony whereof we have signed our names to this specification in the presence of two subscribing witnesses.

FRANCIS MORTIMER BURNHAM.
CHARLES ALBERT MYERS.

Witnesses:
WM. F. BOOTH,
D. B. RICHARDS.

Copies of this patent may be obtained for five cents each, by addressing the "Commissioner of Patents, Washington, D. C."